United States Patent Office.

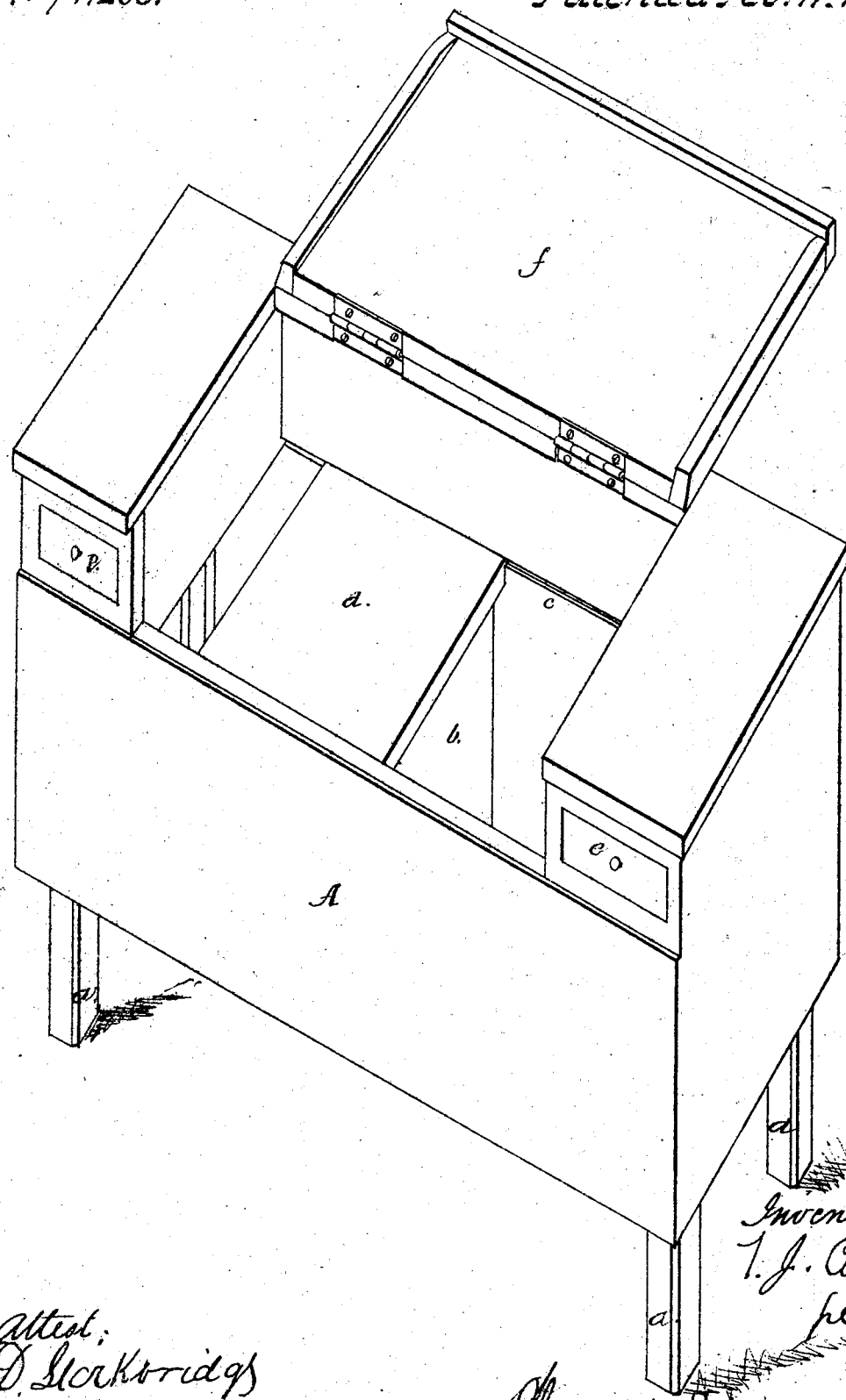

T. J. CORR, OF CARLINVILLE, ILLINOIS.

Letters Patent No. 74,200, dated February 11, 1868.

IMPROVED FLOUR AND MEAL-CHEST.

The Schedule referred to in these Letters Patent and making part of the same.

TO ALL WHOM IT MAY CONCERN:

Be it known that I, T. J. CORR, of Carlinville, in the county of Macoupin, and in the State of Illinois, have invented certain new and useful Improvements in Flour and Meal-Chests; and do hereby declare that the following is a full, clear, and exact description thereof, reference being had to the accompanying drawings, and letters of reference marked thereon, making a part of this specification.

A represents a rectangular box or chest, of any given dimensions, provided with suitable legs or feet, $a\ a\ a$, and divided in the middle into two apartments by a partition, $b$. One of these apartments is designed for flour and the other for meal. Immediately over the said apartments is inserted, in the grooves $c\ c$ which extend the whole length of the chest on both sides, a sliding cover, $d$, equal in size to one-half of the whole surface of both apartments, so as to make a complete covering for either, and to prevent the admixture of the ingredients in the different apartments while being taken from either one of them, for which purpose it is designed, as well as for the additional purpose of furnishing a suitable and convenient bread and cake-board. The chest A has at each end additional boxes, which may be provided with drawers, $e\ e$, or with separate lids, for keeping spices or ingredients commonly used for cooking purposes. The chest A has also a main lid or cover, $f$, attached by hinges to a strip or cap, extending along the top of the back side of chest, making an inclined surface when shut, the better to keep off dust and water that might otherwise find their way through the lid into the flour or meal below. The upper side of the front groove, $c$, is formed by a cleat, which is easily removed, thereby allowing the movable cover $d$ to be taken out and washed.

Having thus fully described my invention, what I claim as new, and wish to secure by Letters Patent, is—

The rectangular box A, with partition $b$, and sliding cover $d$, by means of grooves $c\ c$, drawers $e\ e$, and inclined lid $f$, all constructed and used substantially as and for the purposes set forth.

In testimony that I claim the foregoing, I have hereunto set my hand, this 18th day of November, 1867.

T. J. CORR.

Witnesses:
J. M. MASON,
SAMUEL PITMAN.